US006753969B2

(12) United States Patent
Degertekin et al.

(10) Patent No.: US 6,753,969 B2
(45) Date of Patent: Jun. 22, 2004

(54) MICROINTERFEROMETER FOR MEASURING DISTANCE WITH IMPROVED SENSITIVITY

(75) Inventors: Fahrettin L. Degertekin, Decatur, GA (US); Thomas R. Kurfess, Marietta, GA (US); Byungki Kim, Alpharetta, GA (US); Hosein Ali Razavi, Decatur, GA (US)

(73) Assignee: Geogia Tech Research Corporation, Atlanta, GA (US)

( * ) Notice: Subject to any disclaimer, the term of this patent is extended or adjusted under 35 U.S.C. 154(b) by 94 days.

(21) Appl. No.: 10/112,490

(22) Filed: Mar. 29, 2002

(65) Prior Publication Data

US 2003/0038949 A1 Feb. 27, 2003

Related U.S. Application Data

(60) Provisional application No. 60/356,960, filed on Feb. 13, 2002, provisional application No. 60/356,942, filed on Feb. 13, 2002, and provisional application No. 60/279,575, filed on Mar. 29, 2001.

(51) Int. Cl.⁷ .................................. G01B 9/02
(52) U.S. Cl. ....................... 356/521; 356/498
(58) Field of Search ..................... 356/512, 513, 356/514, 521, 498, 499

(56) References Cited

U.S. PATENT DOCUMENTS

| | | |
|---|---|---|
| 4,188,124 A | 2/1980 | Jaerisch et al. |
| 5,402,234 A | 3/1995 | Deck |
| 5,526,116 A | 6/1996 | de Groot |
| 5,565,987 A | 10/1996 | Jain et al. |
| 5,908,987 A | 6/1999 | Atalar et al. |
| 6,038,057 A | 3/2000 | Brazas, Jr. et al. |

OTHER PUBLICATIONS

Degertekin et al., "Optical Displacement Sensor," Publication No. US–2002–0039463–A1, published Apr. 4, 2002.

Zygo Corporation, "Zygo Corporation's New View 5000; Precise, Rapid, Noncontact 3D Surface Profiling," Apr. 2001.

Cooper et al., "High-resolution micromachined interferometric accelerometer," Applied Physics Letters, vol. 27, No. 22, May 29, 2000, pp. 3316–3318.

Manalis, et al., "Interdigital Cantilevers for atomic force microscopy," Applied Physics Letters, vol. 65, No. 25, Dec. 16, 1996, pp. 3944–3946.

Yaralioglu et al., "Analsis and design of an interdigital cantilever as a displacement sensor," Journal of Applied Physics, vol. 83, No. 12, Jun. 15, 1998, pp. 74057415.

(List continued on next page.)

Primary Examiner—Samuel A. Turner
(74) Attorney, Agent, or Firm—Thomas, Kayden, Horstemeyer & Risley, LLP

(57) ABSTRACT

The present invention relates to microinterferometers. An embodiment of a microinterferometer for accurately measuring the distance to an object surface includes a substrate and a tunable, phase-sensitive, reflective diffraction grating formed atop said substrate. The diffraction grating is configured to reflect a first portion of an incident light and transmit a second portion of the incident light, such that the second portion of the incident light is diffracted. The diffraction grating is further configured to be controllably adjusted. The microinterferometer also includes a photodetector for receiving interference patterns produced from the first portion of the incident light reflected from the diffraction grating and the second portion of the incident light reflected from the object surface. The microinterferometer also includes a controller coupled to the photodetector and the diffraction grating for adjusting the diffraction grating, such that the interference patterns are altered. Systems and methods are also disclosed.

36 Claims, 9 Drawing Sheets

OTHER PUBLICATIONS

Chen et al., "Overview of three–dimensional shape measurement using optical methods," Opt. Eng. 39(1), Jan. 10–22, 2000.

DeWitt et al., "Range–finding method using diffraction gratings," Applied Optics, vol. 34, No. 14, May 10, 1995, pp. 2510–2521.

Solgaard et al., "Deformable grating optical modulator," Optics Letters, vol. 17, No. 9, May 1, 1992, pp. 688–690.

Ming C. Wu, "Micromachining for Optical and Optoelectronic Systems," Proceedings of the IEEE, vol. 85, No. 11, Nov. 1997, pp. 1833–1856.

MICROINTERFEROMETER FOR MEASURING DISTANCE WITH IMPROVED SENSITIVITY

CROSS-REFERENCE TO RELATED APPLICATION

This application claims priority to the following co-pending U.S. provisional applications: a) "Micro-Interferometer for High Precision, High-Speed Flatness Measurement," having Ser. No. 60/356,960, filed Feb. 13, 2002 with U.S. Express Mail Label #EL-894720646-US; b) "Micro-Interferometers with Sensitivity Optimization and Self Calibration Capability," having Ser. No. 60/356,942, filed Feb. 13, 2002, with U.S. Express Mail Package No. EL-894720650-US; and c) "Micro-Interferometer for Accurate Absolute Distance Measurements," having Ser. No. 60/279,575, filed Mar. 29, 2001, which are all incorporated by reference herein in their entirety.

This application is also related to the following co-pending U.S. utility patent applications: a) "System and Method for Surface Profiling," having Ser. No. 10/113,362, filed Mar. 29, 2002, with U.S. Express Mail Package No. EL-924223996-US; and b) "Microinterferometers for Distance Measurements," having Ser. No 10/109,754, filed Mar. 29, 2002, with U.S. Express Mail Package No. EL-924223982-US, which are all incorporated by reference herein in their entirety.

FIELD OF THE INVENTION

The present invention generally relates to measurement devices. More specifically, the invention relates to interferometers.

DESCRIPTION OF THE RELATED ART

In general, optical interferometry is the act of splitting and recombining electromagnetic waves, in particular, visible light waves, to measure surface geometries, distance, etc. The advancement in interferometry has come in many avenues of technology. Long-range telescopes, high-precision spectrometers, compact disc players, etc., use some form of interferometry. Micro-machinery is a growing technology field that often utilizes interferometers because, they typically have high resolution and precision. In general, displacement measurements in the sub-nanometer range can be detected with today's interferometers. To examine microscale structures, the lateral resolution of the interferometers, generally, need to be improved. This can be achieved by coupling the interferometer to a regular microscope. Unfortunately, the size of the interferometer becomes rather large and subsequently may not fit in small spaces for inspection. Furthermore, to inspect a large number of microscale structures either the sample or microscope objective is scanned, resulting in slow imaging.

In order to obtain interferometric measurement sensitivity in a small volume, several methods have been developed. One of these methods involves phase sensitive diffraction gratings as described in a technical paper entitled "Interdigital cantilevers for atomic force microscopy," published in Appl. Phys. Lett., 69, pp. 3944–6, Dec. 16, 1996 by S. R. Manalis, S. C. Minne, A. Atalar, and C. F Quate and also in U.S. Pat. No. 5,908,981 to Atalar et al.

Similar structures are also used in microaccelerometers to measure the displacement of a control mass with interferometric precision as described in a paper written by E. B. Cooper, E. R. Post, and S. Griffith and entitled "High-resolution micromachined interferometric accelerometer," Appl. Phys. Lett., 76 (22), pp. 3316–3318, May 29, 2000. It should be noted, however, that these papers discuss measuring relative distance of the object with respect to the reference gratings.

Two well known uses for microinterferometers are range finding and shape measurement, of which there are several optical range finding and shape measurement methods. Traditional range finding using focus analysis is an effective method, but for high accuracy and reduced depth of field, the lenses are typically large. Hence, mechanical scanning to make shape measurement becomes a slow and difficult task. Microscopes can be used to enhance the resolution, but this comes at the cost of extremely short standoff distances from the object, making scanning difficult. Interferometric ranging methods are very accurate, but in ordinary implementations, the methods operate in a relative coordinate space and can be problematic when the object surfaces have abrupt discontinuities.

It would be desirable to have a microinterferometer that can determine an absolute distance as well as relative distance, as opposed to most of today's microinterferometers which can determine only relative distance. It would also be desirable to increase the resolution and sensitivity of the microinterferometer, while keeping the microinterferometer relatively fast enabling measurement of the dynamic response of the microstructures under investigation.

At some point, the sensitivity, and thus the resolution of the microinterferometer can be improved only so much. Like most transmission/receiving systems, this occurs when miniscule differences in the signal can not be detected because of the noise in the system. Once the signal strength, in this case the intensity of the light and the lateral resolution, has been improved to its known limit, generally, the next step is to reduce the noise floor. This, similar to increasing the strength of the signal, increases the signal-to-noise ratio (SNR). In optical systems such as interferometers several noise sources exist. For example, noise caused by the emitting light source, shot noise in the receiving element, electrical noise from backend electrical components, and overall system noise, such as mechanical and thermal noise. It would be desirable to have a microinterferometer that can overcome and/or reduce some or all of the noise in the system. As mentioned, this can increase the SNR and thus improve the overall resolution and performance of the microinterferometer.

Based on the foregoing, it should be appreciated that there is a need for improved microinterferometers that address the aforementioned problems and/or other shortcomings of the prior art.

SUMMARY OF THE INVENTION

The present invention relates to microinterferometers for accurately measuring the distance to an object surface. In this regard, one embodiment of a microinterferometer includes a substrate and a tunable, phase-sensitive, reflective diffraction grating formed atop said substrate. The diffraction grating is configured to reflect a first portion of an incident light and transmit a second portion of the incident light, such that the second portion of the incident light is diffracted. The diffraction grating being further configured to be controllably adjusted. The microinterferometer also includes a photo-detector for receiving interference patterns produced from the first portion of the incident light reflected from the diffraction grating and the second portion of the incident light reflected from the object surface. The microinterferometer also includes a controller coupled to the photo-detector and the diffraction grating for adjusting the diffraction grating, such that the interference patterns are altered.

Methods for optimizing the performance of a microinterferometer are also provided. One such method, among others, is practiced by the following steps: enabling operation of the microinterferometer to measure the distance to a target surface; calculating the distance to the target surface from measurements made by the microinterferometer; and controllably adjusting a tunable diffraction grating of the microinterferometer to optimize the performance of the microinterferometer.

Systems for optimizing the measurements of a microinterferometer are also provided. One such system, among others, includes means for receiving data from the microinterferometer, means for processing the data from the microinterferometer; and means for generating a feedback signal, the feedback signal being related to the data processed by the means for processing and configured to tune a tunable diffraction grating of the microinterferometer.

Methods of fabricating a tunable diffraction grating are also provided. One such method, among others, is practiced by the following steps: providing a substrate; forming an electrode on the substrate; and forming a phase-sensitive, reflective, tunable diffraction grating above the electrode and atop the substrate, such that the diffraction grating is positioned a variable distance away from the electrode.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in greater detail herein, microinterferometers in accordance with the present invention can measure relative and/or absolute distance to an object in a relatively fast manner, particularly when several microinterferometers are working in parallel in an array structure. To that, the microinterferometers can be optimized for displacement sensitivity and reduced noise causing a greater SNR.

Figure 1:
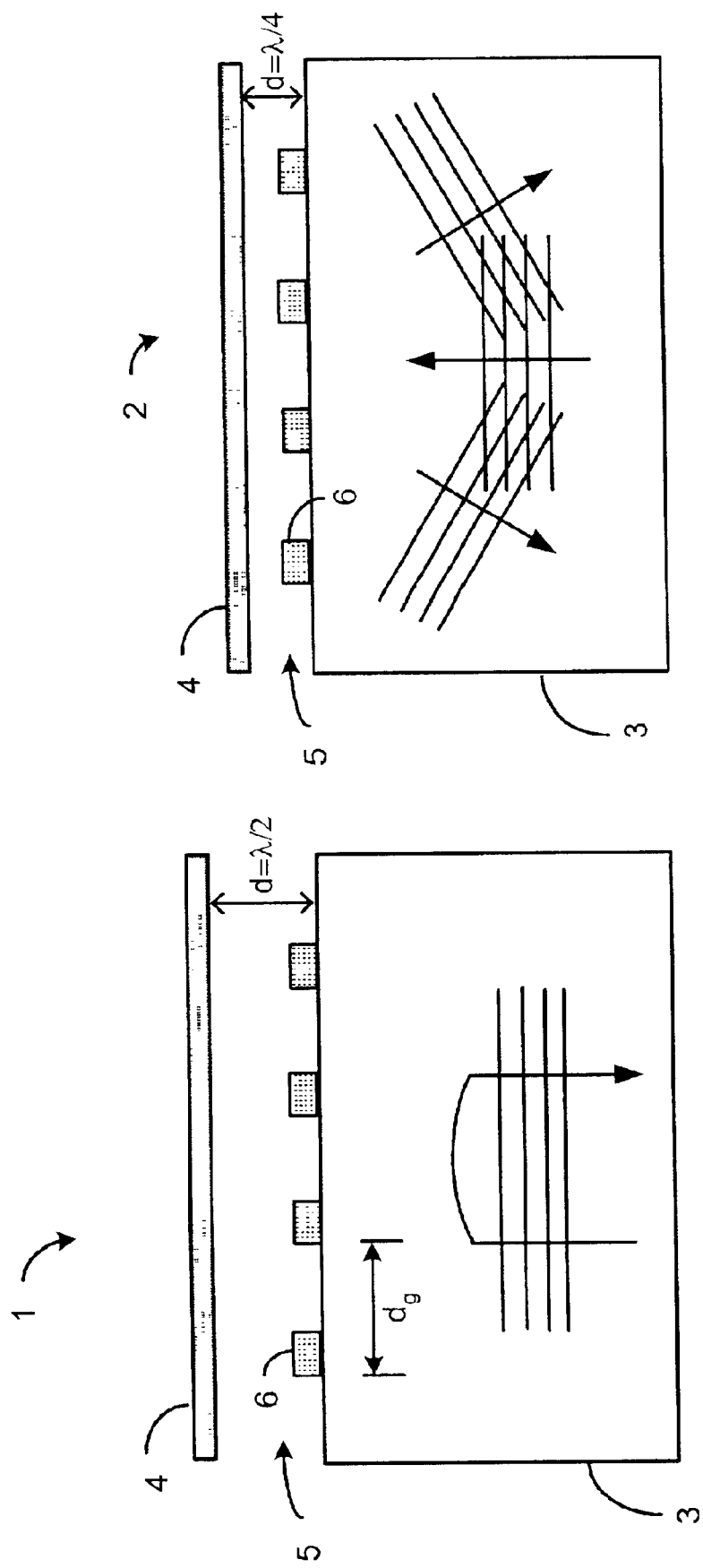
FIG. 1 is a diagram illustrating the concept of using a diffraction grating to split beams in a microinterferometer.

Referring now in more detail to the drawings, FIG. 1 is a diagram illustrating the concept of using a diffraction grating to split beams in a microinterferometer. This concept has been utilized in measuring precise relative displacements, such as for the measurement of Atomic Force Microscopy (AFM) tip displacement and in spatial light modulators, as in the grating light valves (GLV). This concept is also disclosed in co-pending U.S. patent application to F. L. Degertekin, G. G. Yaralioglv, and B. Khuri-Yakub, having Ser. No.(unknown), filed Jun. 28, 2001 with Express Mail Label No. ET-583617335-US and claiming priority to U.S. Provisional Patent Application Ser. No. 60/214,884. AFM, in general, is a technique for analyzing the surface of a rigid material at the atomic level. AFM uses a mechanical probe to magnify surface features up to 100,000,000 times, and it can produce 3-D images of the surface. In general, a GLV contains several tiny reflective ribbons that are mounted over a silicon chip with a tiny air gap in between the chip and the ribbons. When a voltage is applied to the chip below a particular ribbon, that ribbon bends toward the chip by a fraction of a wavelength of an illuminating light. The deformed ribbons collectively form a diffraction grating and the various orders of the light can be combined to form the pixel of an image. The shape of the ribbons, and therefore the image information, can be changed in as little as 20 billionths of a second.

The diagram of FIG. 1 illustrates two scenarios. A first scenario 1 shows what occurs when a target surface 4 is placed a distance of a half-wavelength, $\lambda/2$, away from a reference point, in this case, a reflective diffraction grating 5. A second scenario 2 shows what occurs when the target surface 4 is placed a distance of a quarter-wavelength, $\lambda/4$, away from the diffraction grating 5. The detailed diffraction pattern of such a structure can be found by applying standard diffraction theory to determine the locations and the dimensions of the photo-detectors or light guide apertures.

In both instances, the reflective diffraction grating 5 is formed on a transparent substrate 3. Exemplary materials that may be utilized to construct such elements will be discussed in further detail in relation to FIG. 4. The diffraction grating 5 is formed of an array of diffraction grating fingers 6 equally spaced along a front edge of the transparent substrate 3. It should be noted that, as mentioned above, this diagram is not to scale, and is merely for illustrative purposes. In reality, the diffraction grating fingers 6 would typically have a height on the order of micro- or nanometers.

In the first scenario 1, when an incident light is illuminated through the transparent substrate 3, a first portion of the incident light is reflected from the reflective diffraction grating 5. A second portion of the incident light is transmitted and diffracted about the diffraction grating fingers 6. The transmitted and diffracted light reflects off of the target surface 4 and is measured by a proper detection unit (not shown), such as a photo-detector or a photo-diode. As in scenario 1, the target surface is placed at a distance of $\lambda/2$ or any integer multiple, thereof. In this case, the $0^{th}$ order of the transmitted incident light is reflected back. In general, the $0^{th}$ order is the transmitted light that is illuminated directly, in which case no diffraction, or change in direction occurs. The first portion of the incident light, and the second portion of the incident light which has been reflected off of the target surface 4 interferes with each other. The phase of the two portions of the light waves help form constructive and destructive interference patterns. From the interference patterns, the relative distance between the diffraction grating 5 and the target surface 4 can be determined.

In scenario 2, the same general structure is set up. In this case, the target surface 4 is placed a distance of $\lambda/4$ away from the diffraction grating 5. In practice, the target surface 4 may be placed at any integer multiple of $\lambda/4$ and the same general results will occur. When the first portion of the incident light joins with the second portion of the incident light upon reflection, destructive interference cancels out the two. The second portion of the light travels an extra distance of 2×the distance between the target surface 4 and the diffraction grating 3, which results in a phase difference between the two portions of $\pi$, complete destructive interference. On the contrary though, the higher order diffraction fields, such as the first order, can constructively interfere with the first portion of the incident light. As FIG. 1 depicts, the higher order first and second portions of the incident light are angled and not parallel to the line of illumination, like the $0^{th}$ order beam.

Figure 2:
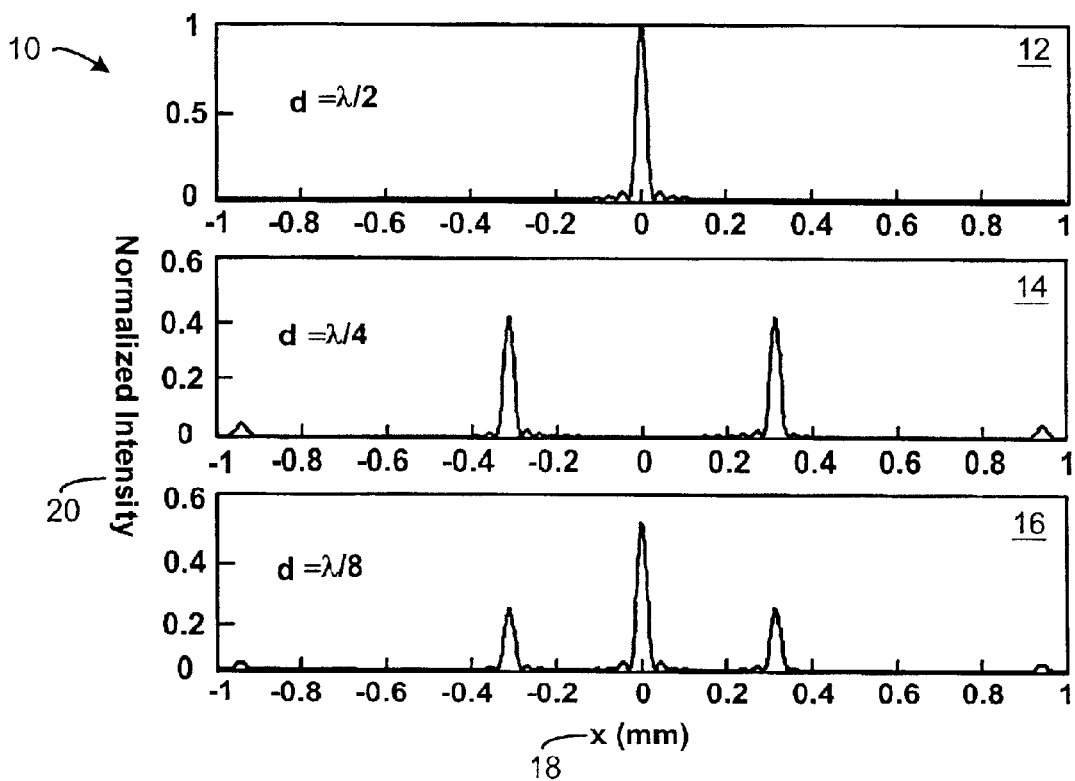
FIG. 2 is a graph illustrating the distribution of reflected light measured on an observation plane with various gap thicknesses utilizing the method illustrated in FIG. 1.

Having described an example of using a diffraction grating to split light beams and therefore measure relative distance, theoretical calculations will be utilized to show the results of using the method described in FIG. 1. Suppose an incident light of $\lambda$=632 nm is illuminated through the transparent substrate 3 onto the reflective diffraction grating 5. A laser can be utilized to provide the incident light. In this case, a helium-neon (HeNe) laser can be utilized. Suppose the diffraction grating 5 contains 10 diffraction grating fingers 6 equally spaced at $d_g$=2 $\mu$m. FIG. 2 is a graph 10 illustrating the distribution of reflected light measured on an observation plane with various gap thicknesses utilizing the method illustrated in FIG. 1. Hereinafter, the distance between a reference point, in this case the diffraction grating 5, and the target surface 4 will be referred to as the gap thickness and can be considered the absolute distance to the surface.

FIG. 2 shows the normalized intensity of reflected light 20 versus an observation length, x 18. The observation length, x, is in the lateral direction, and centered at the $0^{th}$ order beam. In this case, a 100 $\mu$m wide photo-detector has been used. Three scenarios are shown in the graph 10. Scenario 12 shows the normalized intensity 20 with gap thickness, d=$\lambda/2$. Scenario 14 shows the normalized intensity 20 with gap thickness, d=$\lambda/4$. Scenario 16 shows the normalized intensity 20 with gap thickness, d=$\lambda/8$.

As expected, scenario 12 shows the $0^{th}$ order reflected beam with complete constructive interference. The higher order beams, e.g. the $1^{st}$ and $3^{rd}$ order beams, incur destructive interference and so their intensity is cancelled out. Scenario 14 shows that the $0^{th}$ order has been completely cancelled out and the $1^{st}$ and the $3^{rd}$ orders of the reflected beam appear to have partial intensity. Scenario 16 shows that when the gap thickness, d=$\lambda/8$, both the $0^{th}$ order and the $1^{st}$ order contain some light intensity. Perhaps, most importantly, graph 10 attempts to show the periodic nature of the intensity of the orders of the reflected light versus varying gap thickness.

Figure 3:
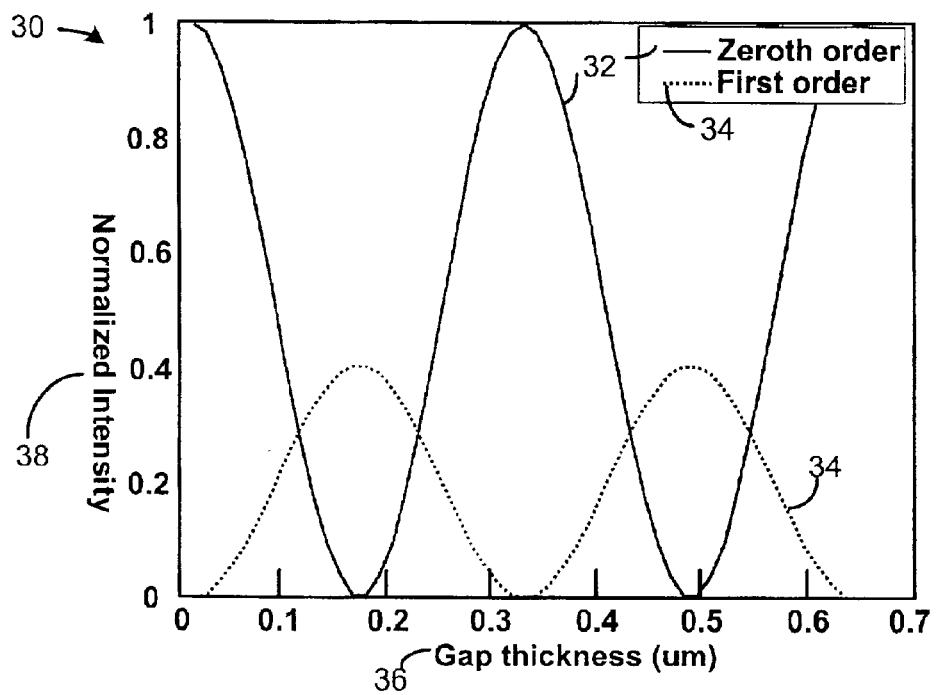
FIG. 3 is a graph illustrating the normalized intensity of various diffraction orders vs. gap thickness utilizing the method illustrated in FIG. 1.

The intensity of these orders as a function of grating-reflecting surface shows the $\cos^2(2\pi d/\lambda)$ and $\sin^2(2\pi d/\lambda)$ variation, as illustrated in FIG. 3. FIG. 3 is a graph 30 illustrating the normalized intensity 38 of various diffraction orders 32 and 34 versus gap thickness 36 utilizing the method described in FIG. 1.

As shown in FIG. 3, the $0^{th}$ order curve 32 takes on a $\cos^2(2\pi d/\lambda)$ shape. This is in line with the results found in FIG. 2. At gap thickness of $\lambda/2$, which is approximately 0.316 $\mu$m, the intensity is greatest. At gap thickness of $\lambda/4$, which is approximately 0.158 $\mu$m, the intensity is zero. The $1^{st}$ order curve 34 takes on a $\sin^2(2\pi d/\lambda)$ shape. The graph 30 of FIG. 3 clearly displays the periodic nature of the diffraction orders. As one can see, keeping all other variables constant and known, one can calculate the relative distance by measuring the intensity of the orders, in particular the $1^{st}$ order. In fact, by monitoring the intensity of any of the reflected orders, one can achieve interferometric resolution on the order of $1\times10^{-5}$ Å/$\sqrt{Hz}$.

Unfortunately, due to the periodic nature of intensity curves, absolute distance cannot be determined, only relative distance. For example, one cannot conclude whether the gap thickness is $\lambda/4$ or $3\lambda/4$. In the discussion that follows, several embodiments will be described that may solve this potential problem. To that, the presented solution also helps to improve the lateral resolution and overall sensitivity of the microinterferometer.

Figure 4:
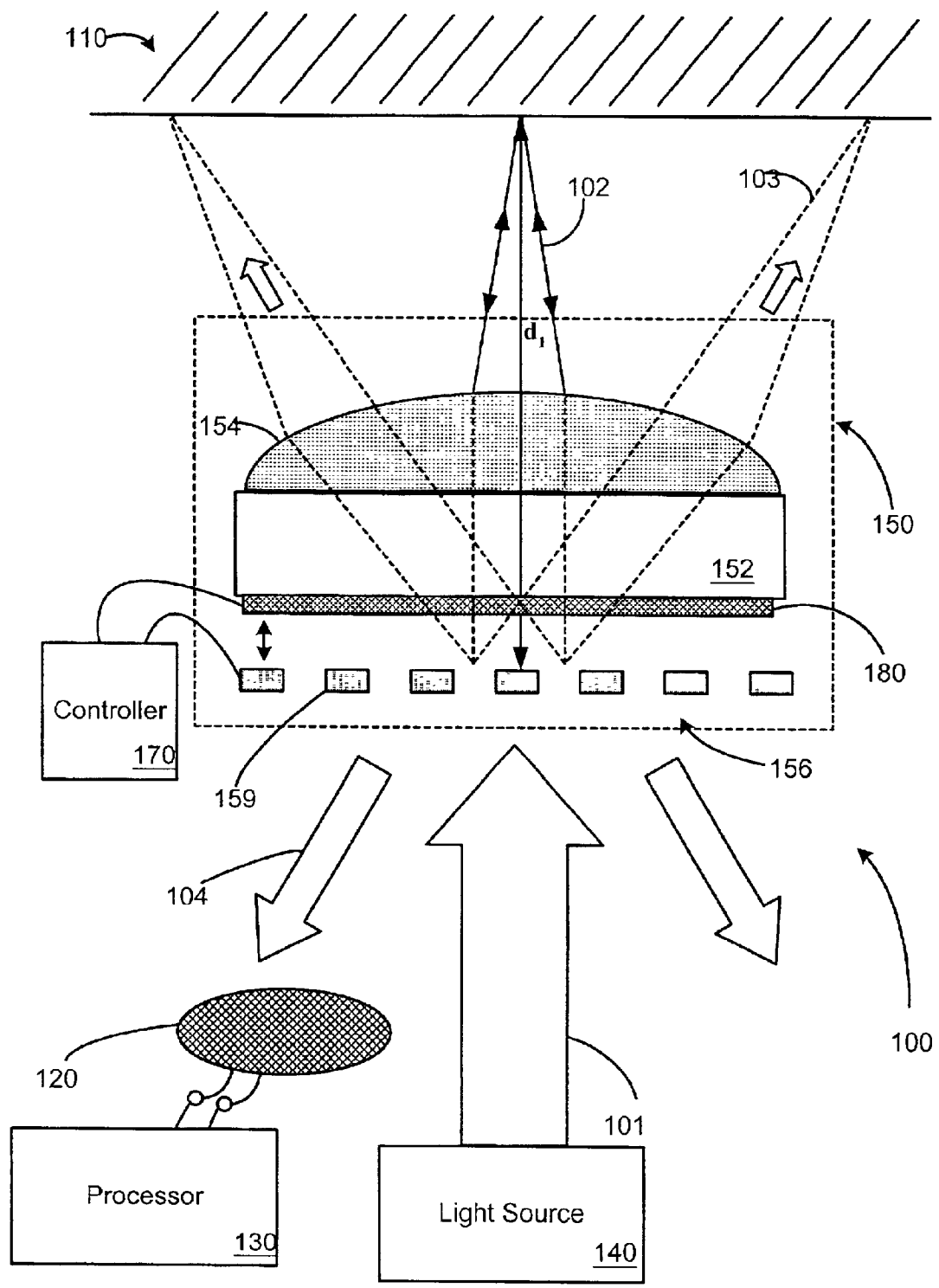
FIG. 4 is a diagram illustrating an embodiment of a microinterferometer in accordance with the present invention.

FIG. 4 is a diagram illustrating an embodiment of a microinterferometer 100 in accordance with the present invention. Included in the microinterferometer 100 is a light source 140 that provides the incident light. The microinterferometer 100 also includes a tunable diffracting micro-objective 150. Included within the tunable diffracting micro-objective 150 is a substantially transparent substrate 152, a tunable phase-sensitive reflective diffraction grating 156 formed below the transparent substrate 152, and a lens 154 formed atop the transparent substrate 152. An electrode 180 is also included in the tunable diffracting micro-objective 150 and formed on the substrate 152 and positioned orthogonal to the diffraction grating 156 such that a portion of the electrode 180 is below each finger 159 of the diffraction grating 156. A photo-detector 120 is also included in the microinterferometer 100 to receive the reflected light. Electrically coupled to the photo-detector 120 is a processor 130, which may be configured to process the received signals and therefore make appropriately desired calculations. In operation, a target surface 110 would be positioned at an unknown distance from a known reference point of the microinterferometer 100, and preferably normal to the direction of the incident light.

In this embodiment, a controller 170 is coupled to the electrode 180 and to the diffraction grating 40. By providing a voltage potential across the electrode 180 and the diffraction grating 40, the controller 170 can electrostatically actuate the diffraction grating 40. This concept will be discussed in further detail in relation to FIGS. 6–8.

The light source 140, in this embodiment, may be a laser, that emits an electromagnetic wave at a known wavelength, λ. An emitted incident light beam 101 would be illuminated onto the reflective diffraction grating 156. In this embodiment, a Helium-Neon (HeNe) laser ($\lambda$=632 nm) may be utilized. In other embodiments, the light source 140 may be a laser emitting another known wavelength. The exact wavelength of the incident light beam 101 may vary as long as the dimensions of the components of the microinterferometer 100 are calculated in terms of the incident light beam 101 wavelength. To that, light sources emitting more than one known wavelength can be utilized as well, although, preferably, a light source emitting one known wavelength would be utilized. In practice, any kind of temporarily coherent light source with a coherence length equal to or greater than two times the distance between the target surface 110 and the diffraction grating 156 may be utilized.

In other embodiments, the incident light beam 101 may be carried via an optical fiber, in which case the light source 140 may be located remotely. As depicted in FIG. 4, the light source is positioned normal to the plane of the transparent substrate 152. Utilizing an optical fiber adds flexibility in placing the light source 140.

In yet other embodiments, the incident light beam 101 may be guided towards the diffraction grating 156 via a wave guide and/or a set of properly placed mirrors. For instance, the light source 140 may be placed relatively parallel to the lengthwise direction of the transparent substrate 152. In this case, a mirror and/or a wave guide can change the direction of the incident light beam 101 so that it is illuminated at a direction normal to the diffraction grating 156. To that, although it appears that the best results occur when the incident light beam 101 is illuminated at a direction normal to the diffraction grating 156, it need not be necessary.

The transparent substrate 152 is typically a planar surface, although not necessarily. For example, the substrate 152 may be cut so as to have a rounded surface for the forming the diffraction grating 156. This may aid in focusing the incident light beam 101. A variety of materials can be utilized for the substrate 152. Non-limiting examples are quartz, silicon, sapphire, glass, and combinations thereof. In other embodiments, the substrate 152 may be non-transparent, but a bulk-etched cavity may be incorporated into the substrate 152 to allow illumination. In general, the transmission coefficient, $\tau$, of the transparent substrate 152 for a given wavelength of incident light beam 101 may be larger than 0.9. The dimensions of the transparent substrate 152 can vary according to the overall structure of the microinterferometer 100, but in general, the lateral thickness of the substrate 152 may be in the range of 0.1 mm–2 mm, and likewise having a working distance of 0.1 mm–2 mm with an F-number from 1 to 5. The lateral length can vary with the structure of the microinterferometer 100. To ease in manufacturing, it may be necessary for the lateral length of the substrate 152 to be sufficiently longer than the width of the lens 154.

In other embodiments, the transparent substrate 152 may be configured, upon manufacture, to assist in focusing the diffracted and/or collimated incident light beams. In other embodiments, the lens 154 may be cut out of the substrate 152, so that the lens 154 would be fully integrated into the substrate 152.

As mentioned, the diffraction grating 156 may include several equally spaced fingers 159. In general, the spatial separation between adjacent fingers may be on the order of the wavelength of the incident light beam 101. The fingers 159 may be constructed of a reflective and conductive material that has a reflection coefficient of between 0.8 to 1. The conductivity of the diffraction grating fingers may be necessary for electrostatic actuation of the fingers 159. In general, the fingers 159 may be shaped as blocks and could be composed of a conductive material with a non-dielectric reflective coating. In other embodiments, the fingers 159 may be composed of a dielectric material and be coated with a conductive reflective material. The dimensions of the fingers 159 can vary greatly with the wavelength of the incident light beam 101. In this embodiment, however, the dimensions of the fingers 159 may be on the order of the wavelength of the incident light beam 101, or about 0.5 $\mu$m to 10 $\mu$m. Several fingers 159 (on the order of 10 $\lambda$ in lateral length) may make up the diffraction grating 156. In this embodiment, the diffraction grating 156 is formed atop the front planar surface of the transparent substrate 152. In other embodiments, the diffraction grating 156 may be formed on the rear planar surface of the transparent substrate 152. In this case, the lens 154 may be removed so that only relative distance would be measured.

The diffraction grating fingers 159 need not be equally spaced. The diffraction grating 156 may be configured to focus the incident light beam 101 on a given focal point. This may be accomplished by varying the spacing between the fingers 159 in such a way so as to focus the light.

The electrode 180 is placed in relation to the diffraction grating fingers 159. In general, the electrode 180 is a conductive material that is deposited onto the substrate 152 and orthogonal to the fingers 159, and positioned off-center so as not to obstruct the transmission of the light. Similar to the diffraction grating fingers 159, the electrode 180 may be a dielectric material covered with a conductive coating. In practice, when a voltage, either DC or AC or both is applied across the electrode 180 and the fingers 159, the fingers 159 would bend toward the electrode 180 in such a way so as to deform the diffraction grating 156. In other embodiments, more than one electrode 180 may exist. The electrodes 180 may be configured upon manufacture so as to keep the diffraction grating fingers 159 substantially parallel to the substrate 152 upon actuation.

The lens 154 may be of a different material than the substrate 152 and so would be formed on the rear planar surface of the substrate 152. In general, the lens 154 may be a planar convex lens with a transmission coefficient of between 0.7 and 1. A non-limiting example of lenses 154 that can be utilized are a binary Fresnel lens or any lens with two or more phase steps. The lateral length of the lens 154 may be between 50 $\mu$m–500 $\mu$m. The thickness of the lens 154 may be up to 50 $\mu$m, but generally, can greatly vary depending on how it is constructed. In other embodiments, as mentioned earlier, the substrate 152 may be formed in such a way that a separate lens 154 may not be necessary. The function of the lens 154 can be incorporated into the substrate 152. In practice, the lens 154 provides for focal depth that helps determine absolute distance. In other embodiments, the absence of the lens 154 may eliminate the possibility of absolute distance measurements. In which case, only accurate relative distance measurements may be made.

The microinterferometer 100 also includes a photo-detector 120. In this embodiment, the photo-detector 120 may be placed parallel and in front of the substrate 152. As the figure depicts, the photo-detector 120 may be positioned to receive a higher diffraction order of the reflected light, such as the $1^{st}$ or $3^{rd}$ order. The observation length, x, can vary, but should be properly positioned so that a higher diffraction order may be observed. For example, the observation length x, may vary with the wavelength of the incident light beam 101. The photo-detector may be placed at an optimal longitudinal distance, e.g. 300 µm, but this may vary with wavelength.

In other embodiments, the photo-detector 120 may be remotely located and the diffracted light may be received via an appropriately placed optical fiber. In yet other embodiments, a wave guide and/or mirrors may change the direction of the diffracted and reflected beams. In this embodiment, as mentioned, the photo-detector 120 is placed parallel to the substrate 152. This allows for a relatively small space, on the order of 100 µm–1000 µm.

Several photo-detectors 120 are known in the art. In general, any photo-detector 120 that can be configured for micromachining and can sustain the desired bandwidth can be utilized. One specific example of a photo-detector 120 that can be used is a silicon P-N junction photodiode. Another type that could be utilized is a P-I-N type photodiode. The utilized photo-detector 120 may depend on the processing speed and responsivity (photocurrent per Watt of incident light) requirements. For example, at wavelengths where the absorption of silicon is small, deeper junction depths may be required to increase responsivity.

Similarly, the geometry of the photo-detector 120 may be adjusted to minimize its capacitance and transit time to increase the detection bandwidth. Some signal conditioning circuitry, such as a transimpedance amplifier, may also be implemented on the same semiconductor substrate as the photo-detector 120 to minimize noise and decrease parasitic capacitance. These photo-detectors 120 with integrated electronics can be configured to operate with bandwidths from DC to GHz range for sensing optical communication applications.

A processor 130 may be included within the microinterferometer 100, but more than likely will be communicatively coupled to the microinterferometer 100 and be an external component. The processor 130 may be any type of electrical components that can process the signals received by the photo-detector 120. Likewise, hardware, software, and/or firmware may be utilized to properly make the appropriate calculations. For example, a personal computer may be configured to process the signals received from the photo-detector 120 in data that is compiled and calculated to produce the absolute distance. A relatively simple digital signal processor (DSP) or an application specific integrated circuit (ASIC) may be utilized to perform the calculations. The processor 130 may also be capable of making several other calculations and/or perform other functions, such as calibration, laser intensity normalization, digital filtering, and signal conditioning.

The microinterferometer 100 can measure the absolute distance, i.e. the gap thickness, to a target surface 110. Preferably, the reflectivity of the target surface 110 would be in the range of 0.5 to 1. It should be noted, however, that the reflectivity of the target surface 110 may be dependent on the wavelength of the incident light beam 101. In which case, the light source 140 may be selected so that a light beam 101 with a particular wavelength is emitted such that the reflectivity of the target surface 110 is highest. The addition of focal depth perception that comes in focusing the diffracted incident light beam 101, allows the microinterferometer 100 to measure absolute distance. To that, the focusing also increases the lateral resolution of the microinterferometer 100.

In operation, the incident light beam 101 is emitted from the light source 140. In this embodiment, the diffraction grating 156 is formed on the front planar surface of the transparent substrate 152. The reflective diffraction grating 156 reflects a first portion 104 of the incident light beam 101. A second portion 102 of the incident light beam 101 is diffracted upon transmission through the diffraction grating 156 and illuminated through the transparent substrate 152. Higher order diffracted light beams 103, such as the $5^{th}$ and $7^{th}$ order light beams are diffracted and will subsequently reflect off the target surface 110 and be lost.

The second portion 102 of the incident light beam 101 is focused to a particular focal distance, as determined by the lens 154. The depth perception gained with focusing helps determine the absolute distance by, generally, placing a bell-shaped distribution over the periodic $\cos^2(2\pi d/\lambda)$ and/or $\sin^2(2\pi d/\lambda)$ functions described in relation to FIG. 3. The main intensity lobe of the bell-shaped distribution may have a 3 dB width of about $\lambda/2$. This results in a resolution of around 0.3 µm for a HeNe laser used as the light source 140. In reality, a bell-shaped curve would be a result of the focal depth gained from the lens 154 when the photo-detector 120 was placed a sufficient distance behind the diffraction grating 156. In practice, however, the photo-detector 120 would typically be placed much closer to the diffraction grating 156, e.g., 1 mm, so a true bell-shaped distribution may not be realized. The curve that would result, however, is still a known and determinable function of the absolute distance.

The second portion 102 of the incident light beam 101 is reflected off of the target surface 110 and returns in the direction of the microinterferometer 100. The photo-detector 120 is positioned to receive the first portion 104 and the reflected second portion 102 which have been combined to form an interference pattern due to the phase shift in the light waves caused by the difference in traveled distance. The processor 130 can then process and calculate absolute distance by counting the intensity cycles of the interference pattern. The intensity curve has a periodicity of $\lambda/2$, and so the distance from a reference depth can be found with an accuracy of $\lambda/2$. The reference depth can be decided from the intensity versus depth profile of the lens 154. For example, the point where the peak intensity is reduced by 10% can be taken as the reference depth.

The resolution can be further improved considering the slope of each intensity cycle, yielding distance measurements with sub-nanometer resolution. For absolute distance measurement resolution better than $\lambda/2$, the variation of the intensity within each interference cycle can be used. In this case, the information shown in FIG. 3 may be used to convert intensity variations to distance.

As mentioned earlier, the sensitivity for relative distance measurements, such as vibrations, etc. of the target surface 110 can be maximized at certain distances from the target surface 110. In the example given, distances of odd integer multiples of $\lambda/8$ produce maximum sensitivity. Upon receiving the interference pattern 104, data can be processed by the processor 130 to determine the absolute distance to the target surface 110. With the absence of the lens 154, only relative distance can be measured. Regardless, this information can be provided to the controller 170 to properly adjust the position of the diffraction grating fingers 159 by electrostatic actuation. By adjusting the position of the fingers 159, the distance between the diffraction grating 156 and the target surface 110 can be altered and set to an odd multiple of $\lambda/8$. The concept of electrostatic actuation will be discussed in further detail in subsequent figures.

The microinterferometer 100 can, therefore, provide absolute distance measurements with high resolution. To that end, the bandwidth of the microinterferometer 100 is limited by the processing capabilities of the electrical components, hardware, software, etc., of the processor 130. Another advantage may be considered to be the extremely small size of the microinterferometer 100. Of most concern, generally, is the longitudinal dimension, which in this embodiment is approximately 500 µm, but may be anywhere in the range of 100 µm–1000 µm, from the front of the lens 154 to the photo-detector 120. It should be noted, that this is one example, and the longitude distance can vary greatly with the particular components utilized, the configuration utilized, and the general implementation. The lateral dimension can be relatively small as well. The longest element may be the substrate 152, which may be only slightly longer than the diffraction grating 156 and/or lens 154, which can vary in range, but typically would be on the order of 10λ–1000λ. This allows for the possibility of mounting several microinterferometers 100 into an array or matrix structure.

Figure 5:
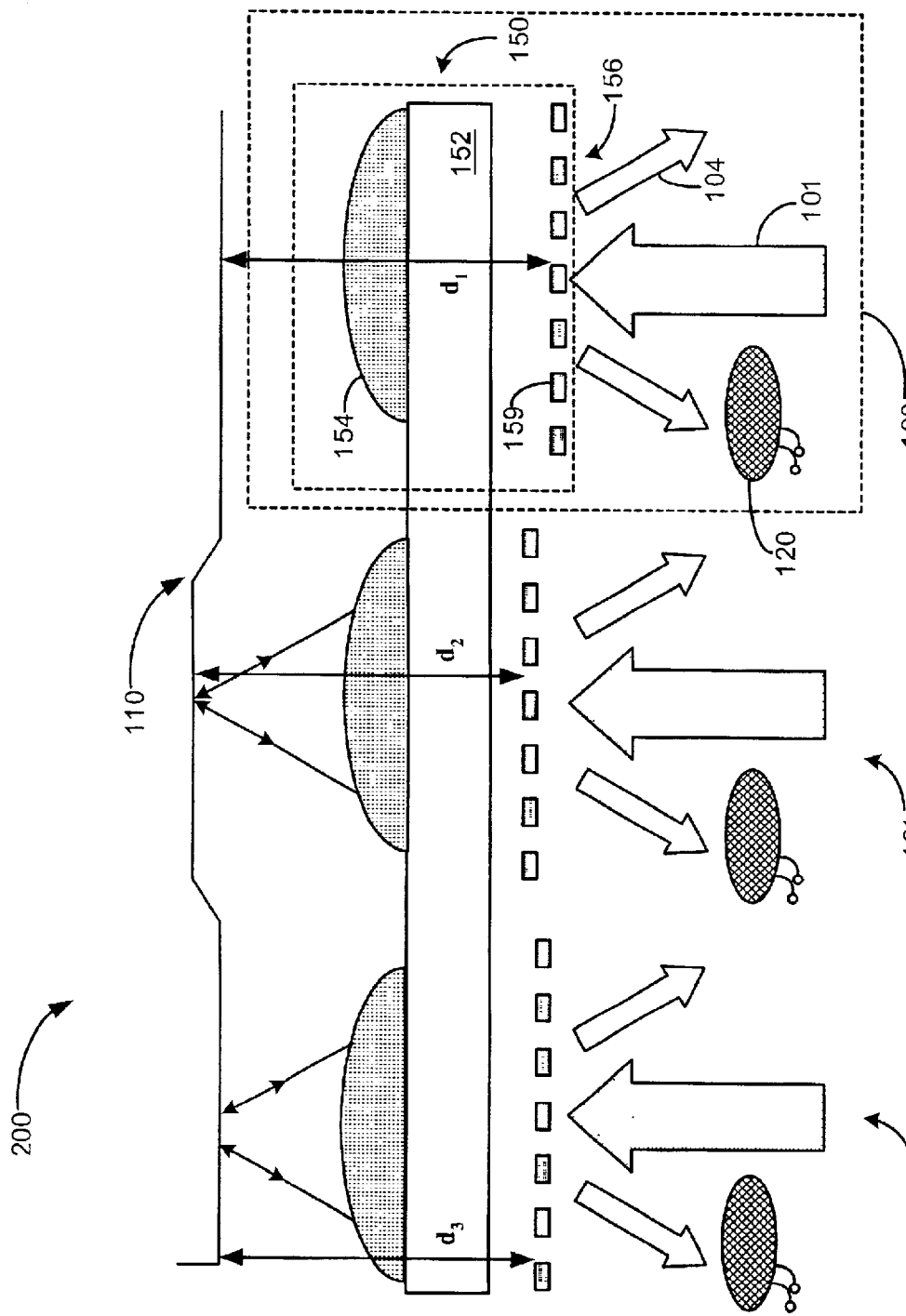
FIG. 5 is a diagram illustrating an array of microinterferometers in accordance with embodiments of the present invention.

FIG. 5 is a diagram illustrating an array 200 of microinterferometers 190–192 similar to that described in FIG. 4. The array of microinterferometers 200 can be placed so as to measure the absolute distance of a target surface 110. The array 200 of microinterferometers 190–192 operating in parallel could substantially increase the speed of imaging and measurement of microstructures with high resolution by covering a greater area at the same time.

As one can see, the target surface 110 may have inconsistencies in its shape. Utilizing the principals described in FIG. 4, the array 200 of microinterferometers 190–192 can properly measure the absolute distance to the target surface 110. Due to the inconsistency in the target surface 110, each microinterferometer 190–192 may not be optimized for sensitivity of relative distance measurements. Fingers 159 of a reflective diffraction grating 156 of each microinterferometer 190–192 can be adjusted so that they are positioned to realize maximum sensitivity. In the example described in FIGS. 1–3, this would be at distances to the target surface 110 of odd integer multiples of λ/8. Each microinterferometer 190–192 may have distinct actuated diffraction gratings. This allows for the microinterferometers 190–192 to more closely align with the target surface 110.

The microinterferometer 190 includes a tunable diffracting micro-objective 150 that includes a substantially transparent substrate 152. The substrate 152 may be shared by the microinterferometers in the array 200. As mentioned, three microinterferometers 190–192 are included in the array 200, but typically many more (e.g. 100–1000) would be included and could share the same substrate 152. In general, the substrate 152 may be similar to the substrate 30.

As illustrated in FIG. 4, the microinterferometer 190 also includes a photo-detector 120 that can receive the interference pattern 104. Although not shown, a separate light source may be applied to each microinterferometer 190–192, but more likely, one light source would be provided and a means of distributing the incident light, such as a beam splitter or a transmission diffraction grating can be used.

Each diffraction grating 156 may be actuated with different actuation levels. In the preferred embodiment, electrostatic actuation is utilized, and so different voltage potentials can be applied. What results, is various distances, $d_1$, $d_2$, and $d_3$, from the target surface 110. Each distance may be a distinct or similar odd integer multiple of λ/8.

The use of the array 200 displays an alternative use of the tunable reflective diffraction gratings 156. When each diffraction grating 156 is positioned at odd integer multiples of λ/8, the voltages that are needed to deform the diffraction gratings are known. From the voltages, the topology of the target surface 110 can be profiled and mapped.

Figure 6:
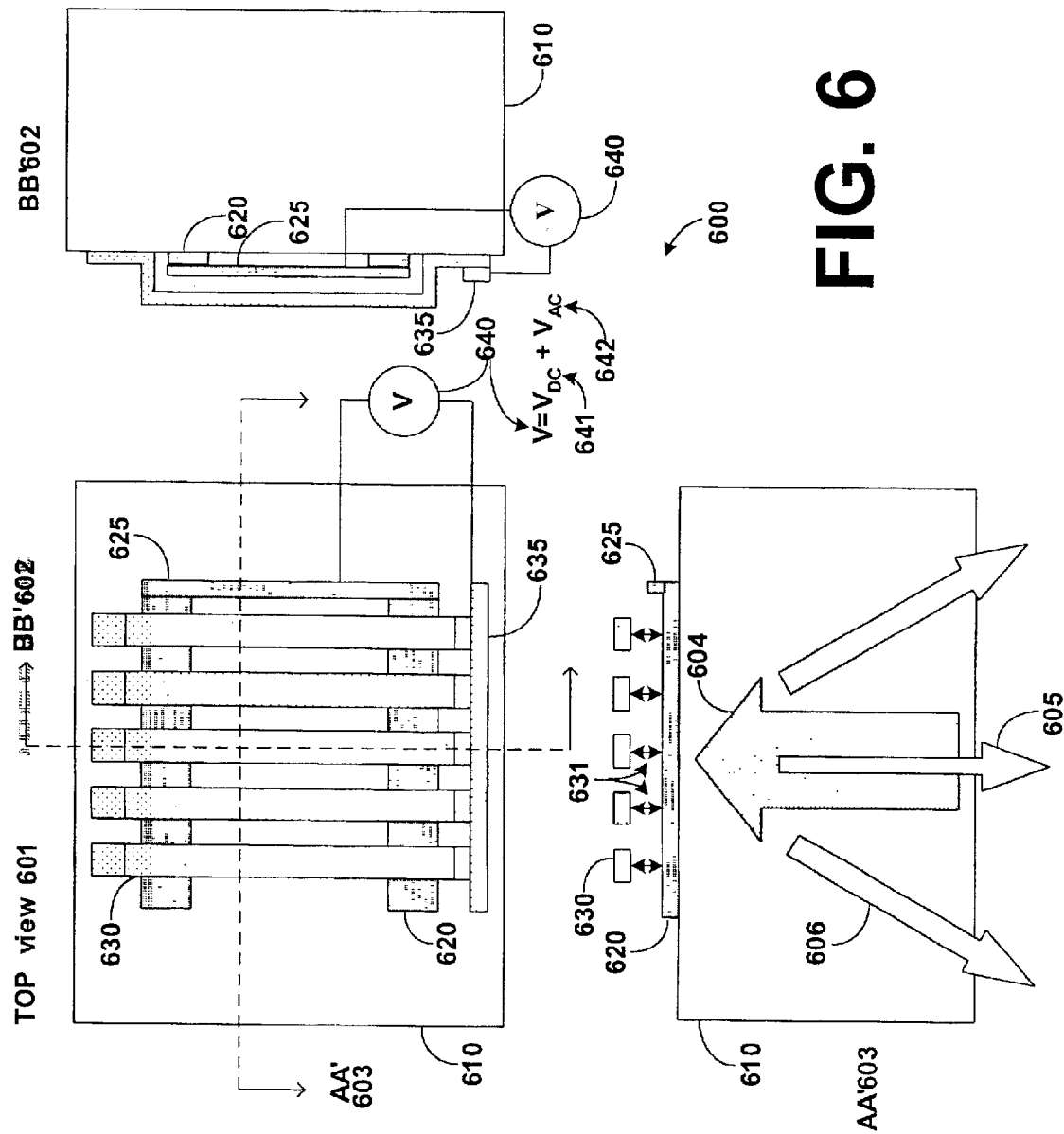
FIG. 6 is a diagram illustrating a tunable diffraction grating that is in accordance with embodiments of the present invention.

FIG. 6 is a diagram illustrating a tunable diffraction grating 600 that is in accordance with embodiments of the present invention. Several views of the diffraction grating 600 formed atop a substrate 610 are utilized to better display the image. The diffraction grating 600 is composed of several beam-dimensioned fingers 630 that, in this embodiment, are equally spaced apart. As mentioned earlier, the fingers 630 may also be position in such a way so as to guide light in a given direction and/or to focus the light. In this embodiment, the fingers 630 are coupled to each other by a conductive crossbeam 635. Formed on the surface of the substrate 610 but below the fingers 630 are two electrodes 620 coupled by a second conductive crossbeam 625. In other embodiments, as will be described in FIG. 7, separate electrodes may be aligned with each finger 630 of the diffraction grating 600 allowing for more flexibility. The fingers 630 of the diffraction grating 600 may be placed above the electrodes 620 by a variable distance 631. Upon electrostatic actuation, the fingers 630 may only be pulled closer to the electrodes 620, thus changing the variable distance 631. A voltage potential 640 is applied across the electrodes 620 and the fingers 630. The voltage potential may contain a $V_{DC}$ portion 641 and/or a $V_{AC}$ portion 642. The total distance between the electrode 620 and the diffraction fingers 630 may be in the order of the wavelength, λ, so that the fingers 630 can be moved at must λ/4 before electrostatic collapse. This motion range guarantees that the detection sensitivity can be optimized regardless of the initial position of the microinterferometer on the curve shown in FIG. 3.

In this embodiment, electrostatic actuation is utilized to vary the relative distance 631. The attractive electrostatic force is generated by applying voltage 640 between two electrodes (i.e. the electrodes 620 and the fingers 630) and is proportional to the square of the applied voltage 640 and inversely proportional to the distance 631 between the electrodes. With this known force and the apparent stiffness of the grating fingers 630, the distance 631 between the electrodes 620 on the substrate 610 and the moveable fingers 630 can be predicted and consequently adjusted.

In other embodiments, different actuation methods suitable for micromachining can be utilized, such as magnetic actuation. To that, an applied voltage potential is used as the means of controlling the actuation, although with other actuation methods, other means of controlling can be used. Therefore, it should be noted, that other methods of actuation and subsequently the means for controlling the actuation could be utilized and so the present invention should not be limited to only those mentioned herein.

In this embodiment, the tunable diffraction grating 600 is formed atop the rear planar surface of the substrate 610. Accordingly, an incident light beam 604 is illuminated onto the diffraction grating 600 from underneath and through the substrate 610. A target surface (not shown) would be positioned above the diffraction grating 600.

In operation, as the incident light 604 is illuminated onto the diffraction grating 600, a first portion of the light 604 is immediately reflected off of the diffracting grating fingers 630 which, in this embodiment, have been coated with a reflective material, such as aluminum. A second portion of the incident light 604 is transmitted through the diffraction grating 600 and diffracted about the fingers 630 toward the target surface. The second portion is then reflected off the target surface and transmitted back through the diffraction grating 600, through the substrate 610, where the second portion begins interfering with the first portion of the incident light 604 to form an interference pattern 606.

Once the interference pattern 606 has been received by an optical receiving device such as a photo-detector (not shown) the distance to the target surface can be calculated. Once calculated, a controller (not shown) can apply the voltage potential 640 across the electrodes 620 and the fingers 630 in order to change the relative distance 631, which subsequently changes the distance from the diffraction grating 630 to the target surface. This change in position of the diffraction grating 600 may change the phase shift of the first and second portions of the incident light. Generally, the change in phase of the second portion of the incident light is negligible in comparison to the phase shift of the first portion. The phase shift basically shifts the interference pattern 606 and so effectively moves along the curves 453 and 454 of graph 450 (See FIG. 3). As mentioned the sensitivity is maximized at the greatest slope of these curves, and so would be at odd $n\lambda/8$. The voltage potential 640 may contain the $V_{DC}$ portion 641 which acts as a $V_{DC}$ bias that places the diffraction grating 630 at an odd integer multiple of $\lambda/8$ away from the target surface. This allows for maximum sensitivity in measuring any subsequent movement of the target surface. To that, the $V_{AC}$ portion 642 can be added to the voltage potential 640 to act a calibration signal during the optimization stage. For example, the $V_{DC}$ bias can be changed until the diffracted light intensity variation at the AC signal frequency is maximized for a certain AC displacement.

Another potentially powerful application of the $V_{AC}$ portion 642 is to use it as a modulating carrier frequency. The $V_{AC}$ portion 642 can resonate the diffraction grating fingers 630 at a known frequency and so upon utilizing well-known frequency lock-in techniques, noise, such as 1/f noise, can be filtered out during measurements, which can greatly improve the overall performance of a microinterferometer.

Figure 7:
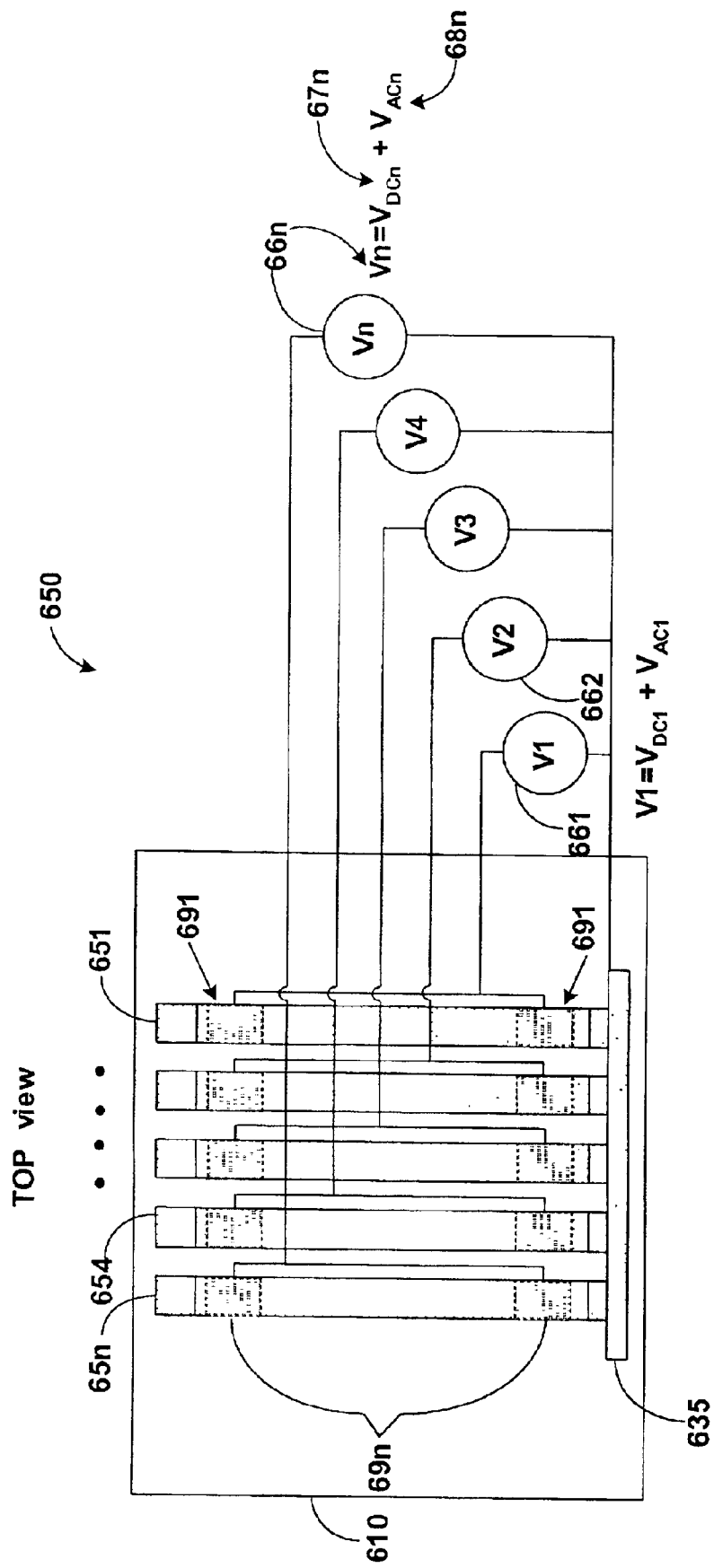
FIG. 7 is a diagram illustrating another embodiment of a tunable diffraction grating in accordance with embodiments of the present invention.

FIG. 7 is a diagram of another embodiment of a tunable diffraction grating 650 in accordance with embodiments of the present invention. In this embodiment, individual fingers 651–65n of the diffraction grating 650 can be judiciously deformed by distinct, dedicated voltage potentials 661–66n. This allows for flexibility in the purpose and application of the diffraction grating 650.

In this embodiment, similar to the previous embodiment, the diffraction grating 650 is formed atop a substrate 610. Each finger 651–65n is beam shaped and coupled together by a conductive crossbeam 635. Unlike the previous embodiment, dedicated electrodes 691–69n are formed and positioned in line with respective fingers 651–65n on the substrate 610. Each set of electrodes 691–69n may be coupled to a dedicated voltage potential 661–66n. Wiring for each pair of electrodes 691–69n can be positioned in such a way so as to not interfere with the transmission of the light.

Each voltage potential 661–66n may contain its own $V_{DC}$ portion 67n and $V_{AC}$ portion 68n. It may be advantageous to have $V_{AC}$ signals at different frequencies. In addition, the alternating voltage, $V_{AC}$, applied to individual microinterferometers in an array may have different frequencies to distinguish between the received optical signals generated from different elements of the arrays. This allows for elimination of the cross-talk between the array elements.

In operation, several different configurations can be realized using dedicated voltage potential 661–66n. In other embodiments, alternating electrodes, or conversely alternating fingers may be tied together to common voltage potentials. A diffraction grating with staggered fingers is another way of varying the interference patterns produced. For example, staggering the fingers so that a first set of fingers is located a distance of $\lambda/4$ away, laterally, from a second set of fingers effectively can perform the equivalent of shifting the interference pattern from that displayed in scenario 12 to that in scenario 14 (See. FIG. 2).

In general, a wide variety of combinations can be configured to perform just as wide a variety of functions. By individually, controlling the position of each finger 651–65n, flexibility in function can be applied.

Figure 8:
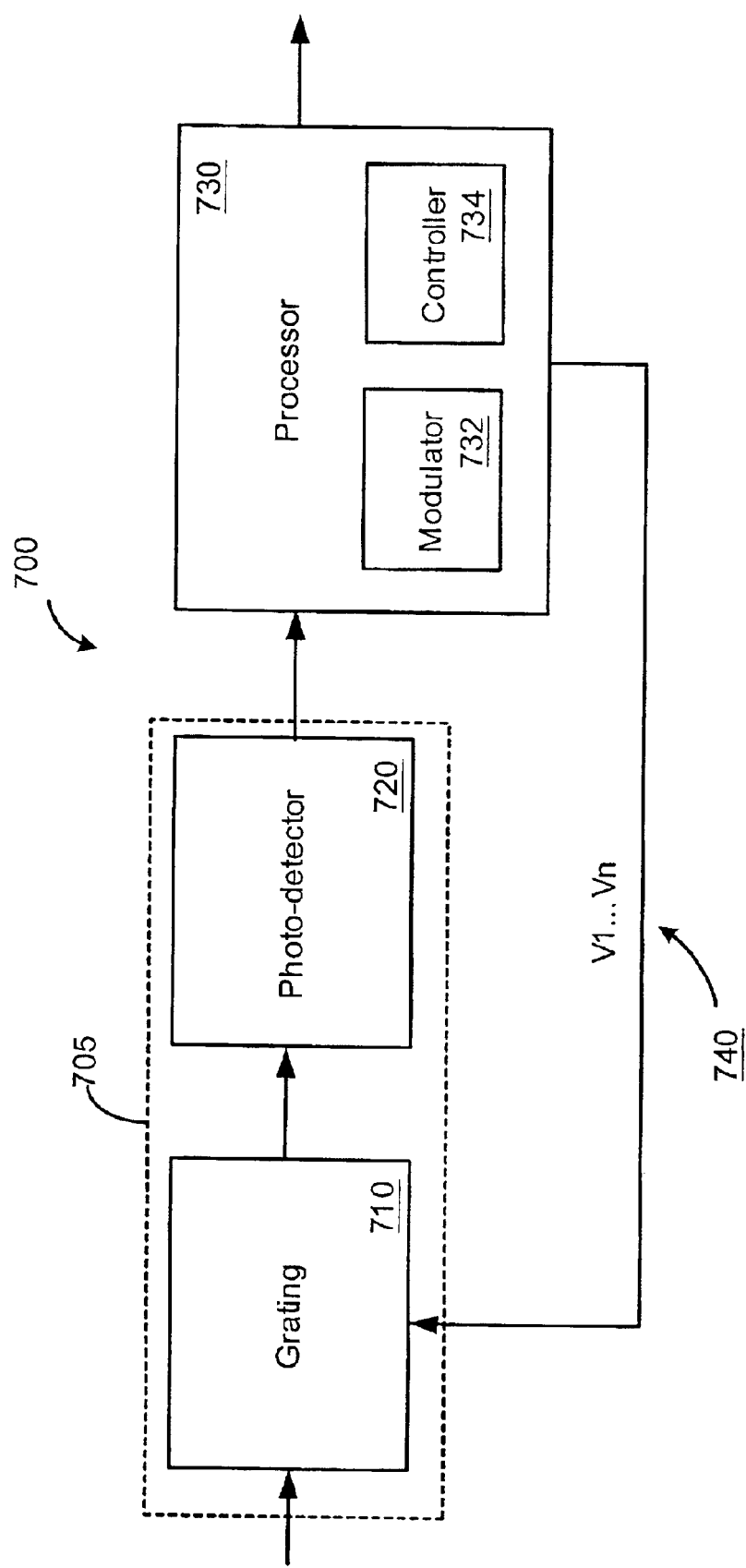
FIG. 8 is a schematic illustrating a system for optimizing the sensitivity of an accompanying microinterferometer in accordance with embodiments of the present invention.

FIG. 8 is a schematic of a system 700 for optimizing the sensitivity of an accompanying microinterferometer 705 in accordance with embodiments of the present invention. In general, the system 700 may incorporate some or all of the components of the microinterferometer 705. The system includes a tunable diffraction grating 710 that may be tuned through actuation methods previously discussed. As light is illuminated on a target surface through the tunable diffraction grating 710, interference patterns are produced received by a photo-detector 720. The photo-detector 720 may process the received light intensity into analog and/or digital signals that can be supplied to a processor 730. The processor includes a modulator 732 and a controller 734 that may be configured to generate a control signal that is to be supplied to the tunable diffraction grating 710 to deform fingers of the grating 710. A general feedback signal 740 can be utilized to continuously measure and then accordingly adjust the grating 710 so that the grating 710 is in position to optimize sensitivity of the microinterferometer 705. Likewise, the feedback 740 can supply a second modulation signal that can be used to modulate the grating 710 to overcome noise and/or calibrate the microinterferometer 705.

The processor 730 may be any combination of electrical components that are required to process the incoming signals. More than likely though, the processor may be a combination of hardware, software, and/or firmware that can be properly configured to perform several functions, such as calculating the distance measured, laser intensity normalization, digital filtering, and signal conditioning. The processor 730 may be located in a computing device (not shown) such as a personal computer, a workstation, a server, or in general any computer that may contain at least one microprocessor coupled with a memory element, and means for receiving a signal from the photo-detector 720, such as coaxial cable, through a Universal Serial Bus (USB) cable, or a serial cable.

The feedback signal 740, in this exemplary embodiment, may supply the tunable diffraction grating 710 with at least one voltage potential. If the grating 710 is so configured, more than one voltage potential can be supplied, such as in the embodiment described in FIG. 7. In this embodiment, electrostatic actuation is the preferred method of actuation and so voltage potentials are supplied through the feedback signal 740. In other embodiments, where other methods of actuation are utilized, various other signals and/or information can be carried through the feedback signal 740.

As mentioned earlier, the voltage potentials may include a $V_{DC}$ portion and/or a $V_{AC}$ portion. The VDC portion may be generated by the controller 734. The VAC portion may be generated by the modulator 732. In general, the controller 734 and the modulator 732 may be comprised of electrical components that may be constructively configured to perform the operations of generating voltage potentials. The controller 734 and the modulator 732 may also be accomplished by any combination of hardware, software, and/or firmware that may be configured to produce the respective voltage potentials. As mentioned, in other embodiments, where a different actuation may be used, the controller 734 and modulator 732 may generate a different type of signal. To that, in other embodiments, the controller 734 and/or the modulator 732 may be located external from the processor 730 but may be configured to communicate with the processor 730.

Figure 9:
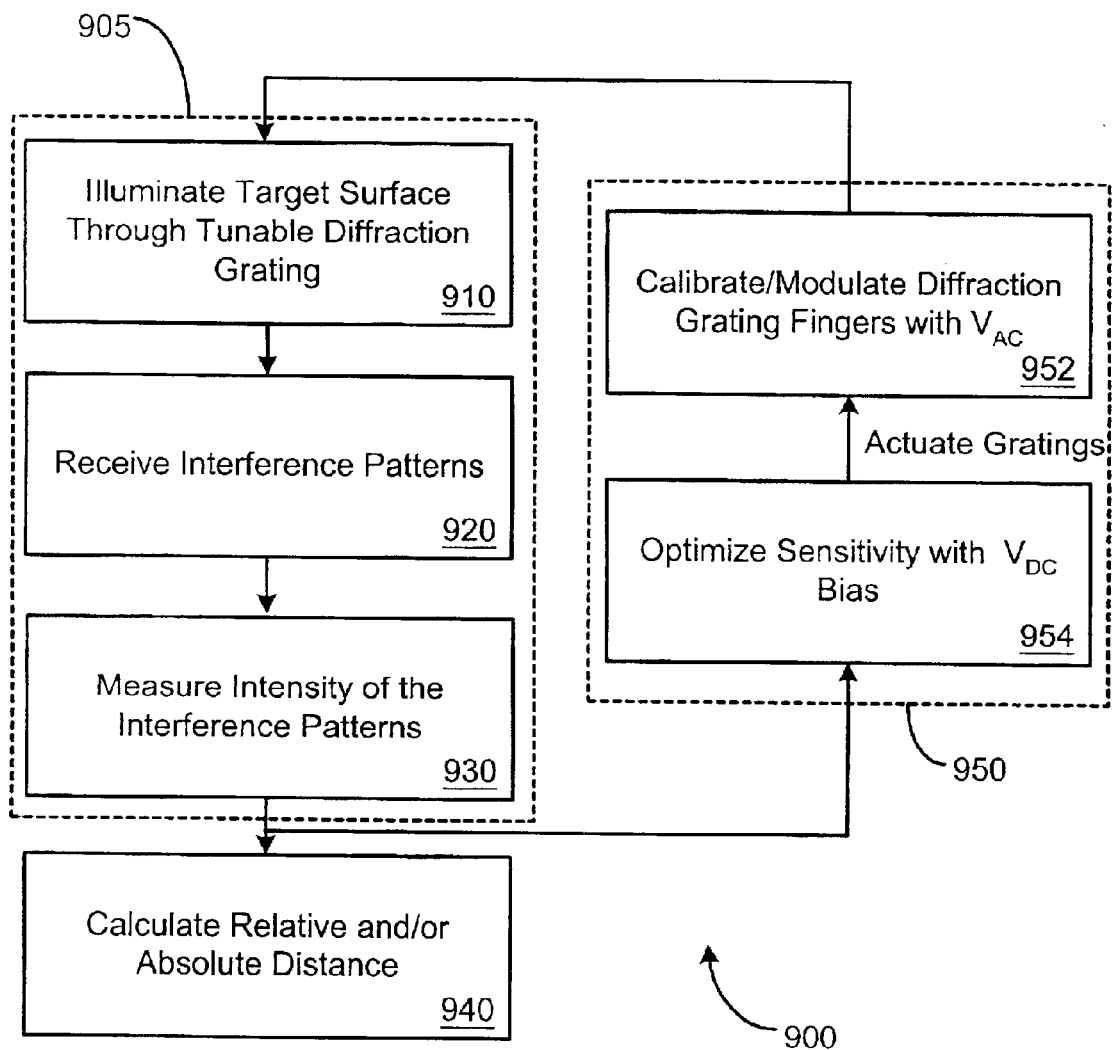
FIG. 9 is a flow chart illustrating a method for optimizing the sensitivity of a microinterferometer and more generally improving the overall performance of a microinterferometer in accordance with embodiments of the present invention.

FIG. 9 is a flow chart illustrating a method 900 for optimizing the sensitivity of a microinterferometer and more generally improving the overall performance of a microinterferometer in accordance with embodiments of the present invention.

The method 900 begins with measuring the distance to a target surface (step 905). In some embodiments, the relative distance to the target surface may be measured. In other embodiments, the absolute distance to the target surface may be measured. In yet other embodiments, both measurements may be made. In general, the distance to the target surface is related to a reference point in the microinterferometer, which typically is the diffraction grating.

Once the distance is measured by the microinterferometer, the measurement data can be processed so that the distance can be calculated (step 940). Typically, this can be performed by a processor, which may be a computing device such as a personal computer. The processor may be configured to perform several other functions with the data as well.

Either before or after the data is calculated, a control signal may be generated based on the measured and/or calculated data to actuate fingers of a tunable diffraction grating of the microinterferometer (step 950). Once the fingers have been appropriately actuated, the measurements may be made again. This procedure may continue, as the feedback loop provides for constant monitoring.

As described in sufficient detail in prior figures, several embodiments of microinterferometers can properly measure the distance to the target surface. A simplified description of the general method of measuring the distance may begin with illuminating the target surface with an incident light beam through the tunable diffraction grating (step 910). Once illuminated, interference patterns can develop through constructive and destructive interference of reflected light off of the tunable diffraction grating and reflections off of the target surface that has been diffracted through the diffraction grating. A photo-detector may then receive the interference pattern (step 920). Once received proper electrical components working with the photo-detector or included within the photo-detector may then measure the intensity of light of the interference patterns (step 930). Interpretation of the interference patterns may come in subsequent calculations.

From either the measured intensity of the interference patterns or from processed calculations, a voltage potential may be generated that carries proper actuation information. The voltage potential may carry a DC portion that can deform chosen fingers of the tunable diffraction grating to certain predetermined optimum positions. By applying this DC bias across the chosen fingers and an electrode the fingers may be deformed and subsequently the sensitivity of the microinterferometer can be optimized (step 954). Upon actuation, an AC portion of the voltage potential may also be supplied that can act as a calibration signal during sensitivity optimization. For example, the DC bias can be changed until the diffracted light intensity variation at the AC signal frequency is maximized for a certain AC displacement. The AC signal can also act to modulate the fingers to person positions at a known frequency (step 952). As a result, upon calculation, known frequency lock-in detection techniques can be used to lock in at the modulating frequency. Any vibrations from noise can thus be overcome, because, in essence they are modulated out. Improving the sensitivity of the microinterferometer and eliminating noise in the system can help optimized the performance of the microinterferometer.

Figure 10:
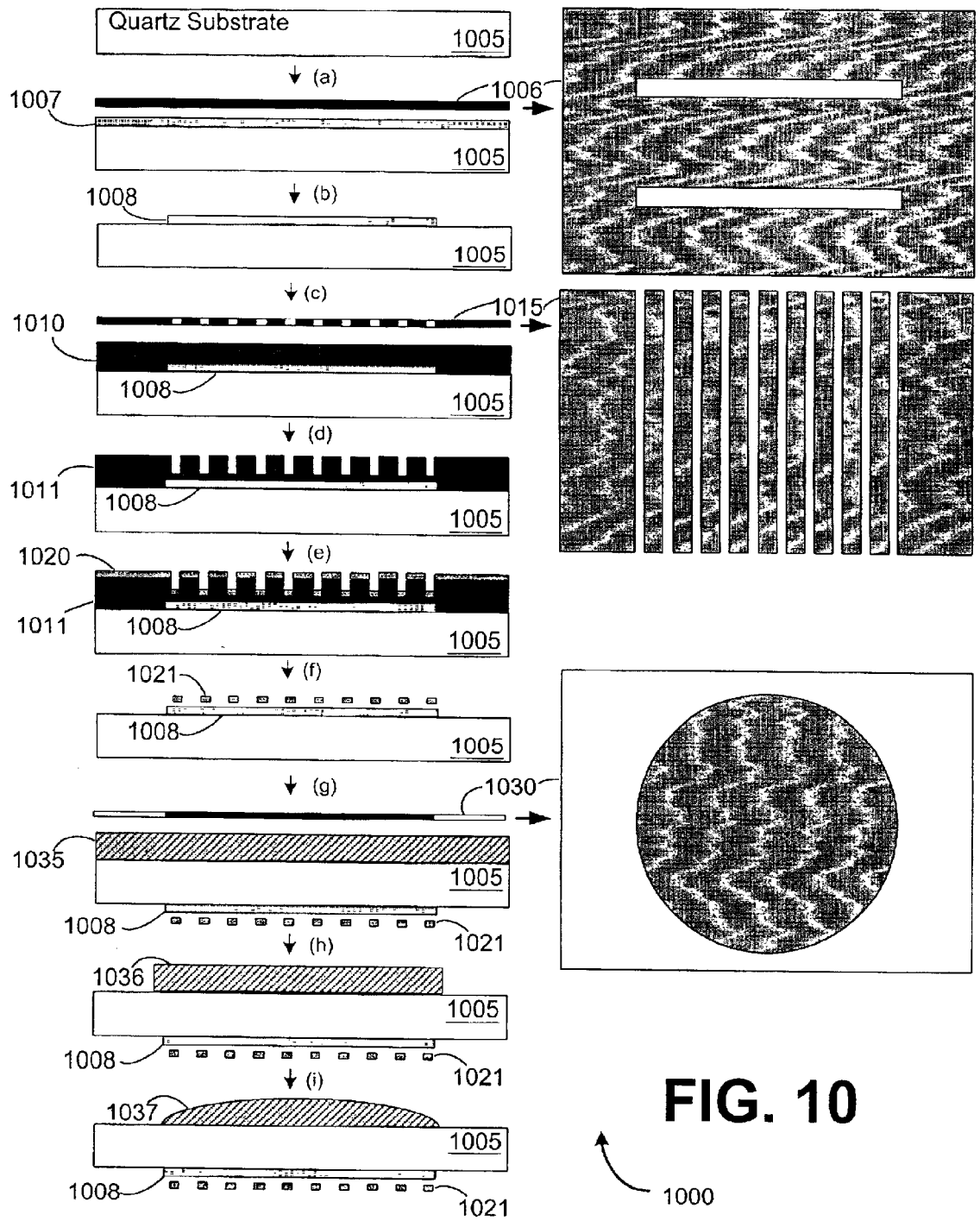
FIG. 10 is a flow chart illustrating a method for fabricating a tunable diffracting micro-objective in accordance with embodiments of the present invention.

Having thus described several embodiments of a microinterferometer, attention is now directed towards FIG. 10, which aims to describe a method 1000 of fabricating a tunable diffracting objective 150 in accordance with the present invention. The general method 1000 can be accomplished with several photolithography and/or surface micromachining techniques. The method 1000 begins with a bare substrate 1005. In this embodiment, the substrate is planar and FIG. 10 depicts the cross-sectional view of the substrate 1005. The substrate 1005, as mentioned above, is substantially transparent therefore allowing light to be illuminated through. In this embodiment, quartz may be utilized as the substrate 1005. In other embodiments, materials such as sapphire and/or different types of glass, may be utilized. In yet other embodiments, non-transparent materials may be utilized. An added step of bulk-etching a cavity to allow illumination through the substrate may be necessary, though. A dielectric anti-reflection layer (not shown) may be deposited on the substrate 1005 to improve transmission through a diffraction grating 521. This layer may be composed of silicon nitride or silicon oxide depending on the substrate 1005 material.

Generally, the first thing that may be done is to form electrodes 1008 on the substrate 1005. This may be done by first depositing a first photo-resist (PR) layer 1007 on the substrate 1005. The PR layer 1007 may be any commonly utilized positive or negative tone PR material, of which many are known in the art. A first photo-mask patterned for the specific shape of the electrodes 1008 may be used to pattern the PR layer 1007 using photolithographic techniques, most commonly involving ultraviolet radiation (step (a)). Depending on the deposition method used for the electrodes 1008, a bright-field or dark-field photo mask 1006 can be used to pattern the PR layer 1007. The photo mask 1006, generally, will shape the electrodes 1008 for the tunable diffraction grating of the tunable diffracting microobjective 150. In this embodiment, two electrodes 1008 are beam shaped and run parallel to each and orthogonal to the diffraction grating. In other embodiments, as described in FIG. 7, the electrodes 1008 may not be beam shaped and may be disjoint. The electrodes 1008, in this case, may be designed to be aligned directly underneath each diffraction grating finger.

Once patterned, a conductive material may be deposited onto the PR layer 1007 and substrate 1005, to form the electrodes 1008 (step (b)). Once the PR layer 1007 is removed, the electrodes 1008 remain. As mentioned, the conductive material may vary. For example, the conductive material can be aluminum, gold, silver, etc.. Alternatively, a conductively doped polysilicon may be used if high temperature processing is utilized during later steps, such as with low pressure chemical vapor deposition (LPCVD). In yet other embodiments, a transparent conductive layer may be utilized, such as indium tin oxide. The electrodes 1008 may be coupled together upon patterning, or an extra step may be required to provide for an electrode cross-beam 625 (See FIG. 6).

The next step is to form diffraction grating fingers 521 at a initial gap distance away from the electrodes 1008. This may be accomplished by depositing a sacrificial PR layer 515 on top of the electrodes 1008 (step (c)). The sacrificial layer 515 may be a low temperature deposited or thermally grown silicon oxide or any other material compatible with the materials of the electrodes 518 and diffraction grating fingers 521. A diffraction grating fingers photo mask 1015 may be used to pattern the sacrificial PR layer 515 by using known photolithographic techniques. Upon removing the exposed portion of the PR layer 515 the channels remain. (step (d)).

In this embodiment, the fingers 521 may be equally spaced apart and similar in dimension. In other embodiments, the fingers 521 may be spaced and configured in such a way so as to guide light beams in a particular direction and/or to focus the light. In either of these cases, the photo mask 1015 may be configured in such a way so as to allow particular spacing and/or dimension requirements for the fingers 521.

It should be noted, that several different photolithography techniques are known in the art, and ultraviolet radiation, is just one example of radiation that can be utilized. It is not the intent of this document to limit this invention to any particular type of radiation as well as any particular photolithography technique.

The reflective diffraction fingers 521 can be deposited onto the substrate 1005 and PR layer 515 by using a lift-off technique or sputtering of a thin (0.1–2 $\mu$m) metal layer 1020, such as aluminum, gold, silver, etc. (step (e)). In the preferred embodiment, the reflective material 1020 is aluminum, although several other materials such as those mentioned above may be utilized.

As an alternative, a multi-layer structure may be utilized for the diffraction grating fingers 521. For example, first a structural layer may be deposited, such as silicon nitride. Then, this layer may be coated with a thin metal layer, such as aluminum, to provide for the reflectivity.

Once the second PR layer 1011 is removed (step (f)), deformable reflective diffraction grating fingers 521 are formed on the substrate 1005. The diffraction grating fingers 521 may be formed together at the ends upon patterning, or an extra step might be required to form a cross-beam 635. Similarly, the required material to attach the diffraction grating fingers 521 on the substrate 1005 may be formed in a similar manner. Typically, these would be placed on the perimeter of the diffraction grating and so would not constrict movement of the fingers 521 as well as block transmission of light. This generally completes the formation of the tunable diffraction grating onto the substrate 1005.

The next step towards fabricating the tunable diffracting micro-objective 150 is to form a micro-lens 1037 on the substrate 1005. The method 504 proceeds with step (g), where a third PR layer 1035 is placed on the substrate 1005. In this embodiment, the PR layer 1035, and subsequently the microlens 1037 is placed on the opposite side of the tunable diffraction grating. A third photo mask 1030 configured for the microlens 1037 is placed over the third PR layer 1035. Ultraviolet radiation is again exposed onto the PR layer 1035 via the third photo mask 1030. Upon removing the exposed portion of the PR layer 1035 (step (h)), a circular area 1036 of the PR layer 1035 remains on the substrate 1005. In the final step, heat is applied to the circular area to form the microlens 1037. In other embodiments, different fabrication techniques, such as those using binary lenses or embossing techniques, can be used to form the microlens 1037 on the planar substrate 1005.

It should be noted, that the method 504 described above discloses, various steps that may be utilized to construct the tunable diffraction grating 156 and, subsequently the tunable diffracting micro-objective 150. Any one or all of these steps may be substituted for alternatives depending on several factors, such as materials utilized and previous and/or later steps. For example, two transparent substrates may be utilized, one for forming the tunable diffraction grating 156 and the other for forming the microlens 1037. These two substrates may be formed together to form the one monolithic substrate 1005.

Of importance to note may be the dimensions of the elements described. The tunable diffracting micro-objective 150 may be utilized by a microinterferometer as described in the previous figures and/or in other embodiments. In general, regardless, the dimensions of the elements are quite small. For instance, the lateral dimensions of the substrate 1005 may be in the range of 0.1 mm to 2 mm. The width of the fingers 521 may be on the order of the wavelength of the incident light beam.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. A microinterferometer for measuring relative distance to an object surface, the microinterferometer comprising:
    a substrate;
    a tunable, phase-sensitive, reflective diffraction grating formed atop said substrate, said diffraction grating being configured to reflect a first portion of an incident light and transmit a second portion of the incident light, such that the second portion of the incident light is diffracted, said diffraction grating being further configured to be controllably adjusted;
    a photo-detector for receiving interference patterns produced from the first portion of the incident light reflected from said diffraction grating and the second portion of the incident light reflected from the object surface; and
    a controller coupled to said photo-detector and said diffraction grating for adjusting said diffraction grating, such that the interference patterns are altered.

2. The microinterferometer of claim 1, further comprising a processor for calculating, from the produced interference patterns, the relative distance between the object surface and a reference point of said microinterferometer.

3. The microinterferometer of claim 2, further comprising a lens formed on said substrate for focusing the second portion of the incident light to a predetermined focal distance.

4. The microinterferometer of claim 3, wherein said lens is between 50–500 $\mu$m wide.

5. The microinterferometer of claim 3, wherein said processor is further to calculate the absolute distance.

6. The microinterferometer of claim 1, wherein said diffraction grating comprises a plurality of diffraction grating fingers positioned substantially linearly along a plane of said substrate.

7. The microinterferometer of claim 6, wherein the position relative to said substrate of at least one of said diffraction grating fingers is controllably adjusted by actuation.

8. The microinterferometer of claim 7, wherein the position relative to said substrate of at least one of said diffraction grating fingers is controllably adjusted by electrostatic actuation.

9. The microinterferometer of claim 8, further comprising at least a first electrode formed on said substrate and configured such that when a voltage potential is provided by said controller and placed across said first electrode and at least one of said diffraction grating fingers, the position of the least one finger may be controllably adjusted.

10. The microinterferometer of claim 9, wherein the position of the at least one finger may be changed to a predetermined position to optimize the sensitivity of said microinterferometer.

11. The microinterferometer of claim 8, wherein said voltage potential may comprise an AC portion for controllably modulating the position of the at least one finger.

12. The microinterferometer of claim 1, further comprising a source of the incident light.

13. The microinterferometer of claim 12, wherein the light is guided from said source via an optical fiber.

14. The microinterferometer of claim 1, wherein said photo-detector is between 50–500 $\mu$m wide.

15. The microinterferometer of claim 1, wherein said substrate is substantially transparent.

16. The microinterferometer of claim 15, wherein said substantially transparent substrate is comprised of quartz.

17. The microinterferometer of claim 1, wherein said photo-detector is positioned substantially parallel to said substrate.

18. The microinterferometer of claim 17, wherein said photo-detector is selectively positioned to receive the intensity of at least one order of the second portion of the incident light reflected from the object surface.

19. The microinterferometer of claim 1, wherein said photo-detector is between 50–500 $\mu$m wide.

20. A method for optimizing the performance of a microinterferometer, the method comprising:
enabling operation of the microinterferometer to measure the distance to a target surface;
calculating the distance to the target surface from measurements made by the microinterferometer; and
controllably adjusting a tunable diffraction grating of the microinterferometer to optimize the performance of the microinterferometer.

21. The method of claim 20, wherein enabling operation of the microinterferometer comprises:
illuminating the target surface through the tunable diffraction grating with an incident light beam;
receiving interference patterns produced by reflections generated by the tunable diffraction grating interfering with reflections generated by the target surface; and
measuring the intensity of the interference patterns.

22. The method of claim 20, wherein controllably adjusting comprises varying the position of diffraction grating fingers of the tunable diffraction grating by actuation.

23. The method of claim 22, wherein the actuation is electrostatic actuation and wherein varying the position of the diffraction grating fingers comprises supplying a voltage potential across an electrode and the diffraction grating fingers to controllably deform the diffraction grating fingers, such that the position of the fingers are placed in a predetermined optimum distance from the target surface.

24. The method of claim 23, wherein the voltage potential further comprises calibration signal to maximize the diffracted light intensity variation.

25. The method of claim 23, wherein the voltage potential further comprises a modulation signal for modulating the position of the diffraction grating fingers.

26. A system for optimizing the measurements of a microinterferometer, the system comprising:
means for receiving data from the microinterferometer;
means for processing the data from the microinterferometer; and
means for generating a feedback signal, the feedback signal being related to the data processed by the means for processing and configured to tune a tunable diffraction grating of the microinterferometer.

27. The system of claim 26, wherein the means for generating further comprises means for generating a DC portion of a voltage potential for electrostatically actuating at least a first diffraction grating finger of the tunable diffraction grating to a predetermined optimum sensitivity position.

28. The system of claim 27, wherein the means for generating further comprises means for generating an AC portion of the voltage potential for modulating the position at the least first diffraction grating finger.

29. A method of fabricating a tunable diffraction grating, the method comprising:
providing a substrate;
forming an electrode on the substrate comprising the steps of:
providing a sacrificial photo-resist (PR) layer on the substrate:
photolithographically patterning channels for the electrode in the PR layer; and
depositing a conductive material to form the electrode; and
forming a phase-sensitive, reflective, tunable diffraction grating above the electrode and atop the substrate, such that the diffraction grating is positioned a variable distance away from the electrode.

30. The method of claim 29, wherein the step of forming the phase-sensitive, reflective, tunable diffraction grating comprises:
depositing a sacrificial PR layer on the substrate;
photolithographically patterning channels in the PR layer, such that an initial distance remains between the base of each channel and the electrode; and
depositing a reflective material in the channels.

31. The method of claim 30, wherein the step of depositing the reflective material comprises:
depositing a structural material in the channels; and
coating the structural material with the reflective material.

32. The method of claim 30, wherein the reflective material is aluminum.

33. The method of claim 29, further comprising the steps of:
providing a second substrate;
forming a microlens on the second substrate; and
joining the second substrate to the first substrate.

34. The method of claim 29, further comprising the step of forming a microlens on the substrate.

35. The method of claim 34, wherein the step of forming the microlens on the substrate comprises:
depositing a PR layer on the substrate;
photolithographically patterning a substantially circular area on the PR layer; and
applying heat to the substantially circular area of the PR layer to form the microlens.

36. The method of claim 29, wherein the substrate is substantially transparent.

* * * * *

UNITED STATES PATENT AND TRADEMARK OFFICE
CERTIFICATE OF CORRECTION

PATENT NO. : 6,753,969 B2  
DATED : June 22, 2004  
INVENTOR(S) : Degertekin et al.

It is certified that error appears in the above-identified patent and that said Letters Patent is hereby corrected as shown below:

Column 20,
Line 26, delete "substrate:" and replace with -- substrate; --

Signed and Sealed this

Thirtieth Day of November, 2004

JON W. DUDAS
*Director of the United States Patent and Trademark Office*